UNITED STATES PATENT OFFICE.

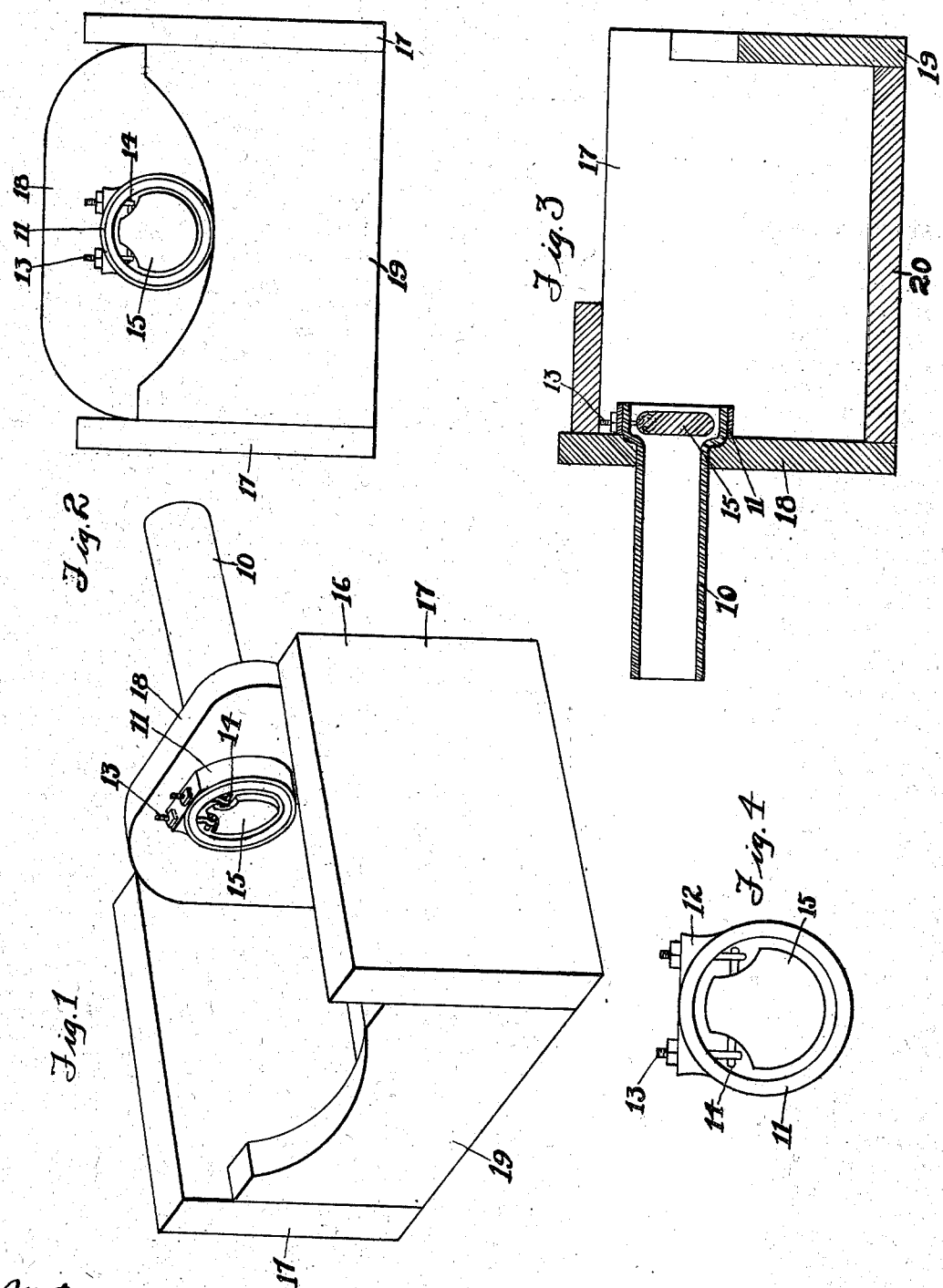

JOHN W. COOK, SR., OF NEVADA, IOWA.

DRAIN-TILE PROTECTOR.

SPECIFICATION forming part of Letters Patent No. 709,395, dated September 16, 1902.

Application filed March 15, 1902. Serial No. 98,344. (No model.)

*To all whom it may concern:*

Be it known that I, JOHN W. COOK, Sr., a citizen of the United States, residing at Nevada, in the county of Story and State of Iowa, have invented certain new and useful Improvements in Drain-Tile Protectors, of which the following is a specification.

The object of my invention is to provide a protector for drain-tiles of simple, durable, and inexpensive construction which can be easily and readily adjusted to the outlet of the tile and prevent animals and foreign substances from getting into the tile.

A further object is to provide a box-shaped device which is adjusted to the tile and prevents sand or other foreign substances from getting near the outlet of the drain-tile and to allow any sand or other material which is on the interior of the tile to fall into the box at the outlet of the tile, and thus prevent any backwater or other substances which are usually prevalent at the opening of the tile from getting back into the tile, and, further, to provide a device of the class described which can be removed, so as to take away any foreign substances which may have accumulated in the box and in which the water will remain until it reaches a certain height in the box, but will flow out of the box before there is sufficient amount of water in the box to reach the lower edge of the drain-tile.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the entire device. Fig. 2 shows a front elevation of the device, showing the cover for the tile in its closed position. Fig. 3 shows a cross-sectional view of the device, and Fig. 4 shows in detail the collar to be attached to the end of the drain-tile.

Referring to the accompanying drawings, I have used the reference-numeral 10 to indicate the tile, which is of any ordinary size and has two holes near one end thereof.

The reference-numeral 11 indicates the collar, which is substantially circular in shape and has a projection which has a flat surface on the upper portion thereof, which I have numbered 12, and having two holes extending through the top portion thereof.

On the interior of the collar 11 and pivotally attached to it by means of the bolts 13 and the metal bar 14 is the cover 15, designed to fit inside said collar, which is substantially circular in shape, with a portion thereof cut away on each side of the upper portion thereof and a circular opening through the top of the cover, designed to receive the metal bar 14 and allow the cover 15 to swing thereon.

I have provided the box 16, having the two side pieces 17, the back portion 18, which is slightly higher than the sides 17 and has a curved upper edge, and the front 19, which is of less height than the sides 17 and having the upper edge thereof curved downwardly, so that the contents of the box can flow out over this top edge readily. In the back portion 18 and near the upper surface thereof is an opening designed to receive the tile and hold it firmly in position when the box is placed in the ground. There is also a bottom 20 to the box, so that the whole device may be easily removed from the position in which it is placed in the ground, if desired.

In practical use, and assuming that the tile is already laid and it is desired to place this device at the end of the tile, the box is placed in the ground and near the end of the tile and the tile is inserted through the opening in the back 18 of the box and the collar 11, and the cover 15 is attached to the end of the tile by means of the bolts 13, so that the cover will swing outwardly from the end of the tile when there is water flowing from the interior of the tile. It will be readily seen that the water will rise in the box until it reaches the upper edge of the front portion 19. The upper portion is so curved as to be below the lower edge of the drain-tile, so that it will readily flow out of the box and will leave sand or other foreign substances which may have come through the tile in the box. Then if the owner of the box desires to remove the foreign substances which have accumulated in it he can do it by simply taking off the one section of tile or taking off the collar by removing the bolts 13 and remove the box and take out any foreign substances that may have accumulated and then easily replace the device. My device is a particular advantage in keeping away foreign substances from the mouth of the tile, owing to the height of the sides and the back portion of the box.

Having thus described my invention, what I claim, and desire to secure by Letters Patent of the United States, is—

1. In a device of the class described, the combination of a tile having one or more holes in the periphery thereof and near one end a collar fitting over the end of said tile and one or more holes in the periphery thereof, a cover to fit inside of said tile and on the inside of the collar, means for pivotally attaching the cover to the tile and the collar, and the box having a back through which the tile extends, substantially as and for the purposes stated.

2. In a device of the class described, the combination of a tile having two holes in the periphery thereof and near one end, a collar having holes corresponding with the holes in the tile to fit over the end of the tile, bolts extending through the holes in the collar and holes in the tile, loops on the ends of said bolts which are inside of the tile, a cover having a loop in the upper portion thereof, a bar designed to pass through the loop in the bolts and the loop in the cover, a box having two side portions, a back and front portion, said back portion having an opening in the upper portion thereof designed to receive the tile, the front portion being of less height in the sides and back and being curved downwardly to allow the water to flow from the interior of the box before it reaches the level even with the lower edges of the tile, substantially as and for the purposes stated.

JOHN W. COOK, Sr.

Witnesses:
  A. J. BUNCE,
  G. W. BOYD.